(12) United States Patent
Jaeger

(10) Patent No.: US 7,469,460 B2
(45) Date of Patent: Dec. 30, 2008

(54) BASE FRAMEWORK FOR A MANIPULATING APPARATUS AND MANIPULATING APPARATUS

(75) Inventor: Helmut F. Jaeger, Koenigsbach-Stein (DE)

(73) Assignee: Felsomat GmbH & Co. KG, Konigsbach-Stein (DE)

( * ) Notice: Subject to any disclaimer, the term of this patent is extended or adjusted under 35 U.S.C. 154(b) by 1093 days.

(21) Appl. No.: 10/783,955

(22) Filed: Feb. 20, 2004

(65) Prior Publication Data

US 2004/0226257 A1 Nov. 18, 2004

(30) Foreign Application Priority Data

Feb. 26, 2003 (EP) .................................. 03004123

(51) Int. Cl.
*B23P 23/00* (2006.01)
*B23Q 37/00* (2006.01)

(52) U.S. Cl. ........................................ 29/564; 409/234

(58) Field of Classification Search .................... 29/564; 409/201, 235; 414/222.01; 901/8, 16
See application file for complete search history.

(56) References Cited

U.S. PATENT DOCUMENTS

| | | | | |
|---|---|---|---|---|
| 4,890,241 A | * | 12/1989 | Hoffman et al. | ............... 901/8 |
| 5,353,490 A | | 10/1994 | Kukuljan | ..................... 29/564 |
| 5,439,431 A | * | 8/1995 | Hessbruggen et al. | ........ 409/235 |
| 6,192,572 B1 | * | 2/2001 | Azema | ......................... 29/564 |
| 6,217,496 B1 | * | 4/2001 | Lindem | ...................... 409/235 |
| 6,761,522 B2 | * | 7/2004 | Jager | ............................. 901/8 |
| 2002/0108836 A1 | | 8/2002 | Jaeger | ..................... 198/339.1 |

FOREIGN PATENT DOCUMENTS

| | | |
|---|---|---|
| DE | 4117439 A1 | 12/1992 |
| DE | 4212178 A1 | 10/1993 |
| DE | 10102413 C1 | 1/2002 |
| EP | 0865869 A1 | 9/1998 |
| EP | 0865869 B1 | 5/2002 |

* cited by examiner

*Primary Examiner*—Dana Ross
(74) *Attorney, Agent, or Firm*—Henneman & Associates; Larry E. Henneman, Jr.

(57) ABSTRACT

A base framework for a manipulating apparatus which can be constructed in a modular manner, in particular for an automation cell which is designed for being combined with at least one machine tool, comprising a front wall, a rear wall and side walls which enclose a control space for a control device, a process platform being set up above the control space, the front wall having at least one mechanical interface for fixing a supply module which serves to supply workpieces, and the rear wall having a top rear-wall part which projects beyond the process platform and, on its front side pointing towards the process platform, has a first plurality of mechanical interfaces for the locally variable fixing of a process module for manipulating and/or processing supplied workpieces, the top rear-wall part also having an opening which is arranged above the process platform.

27 Claims, 4 Drawing Sheets

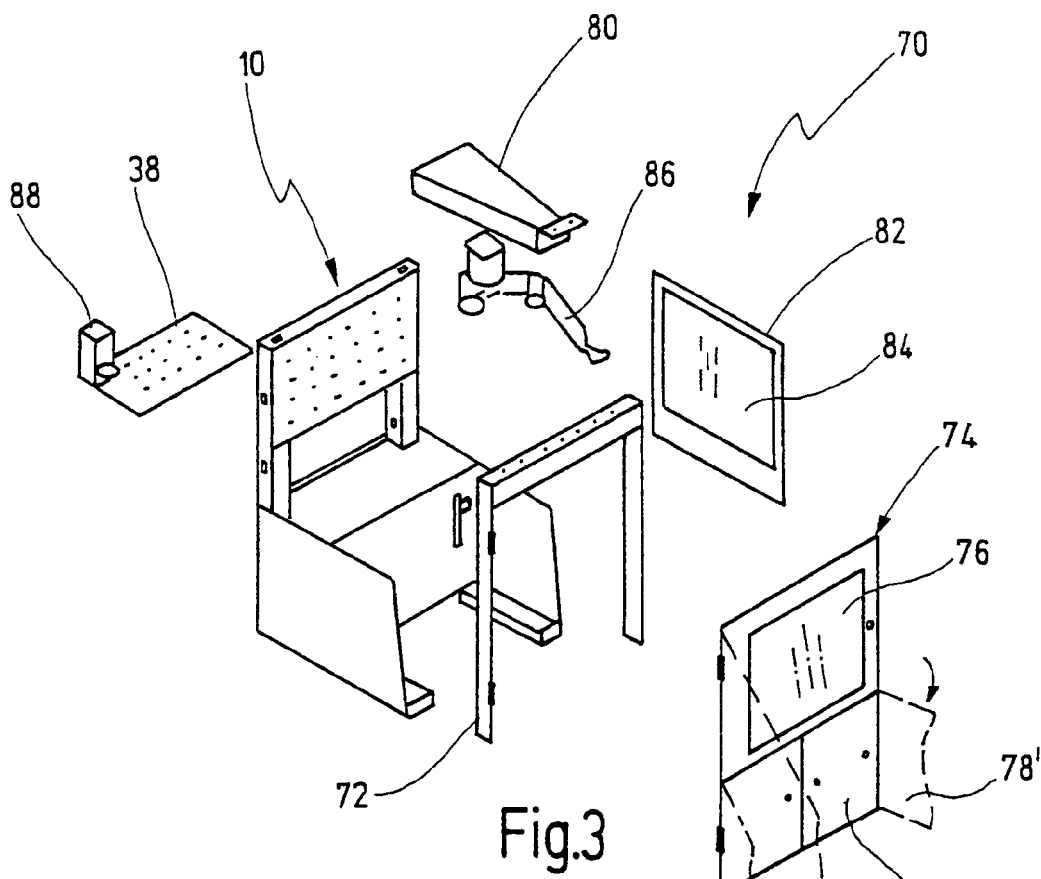
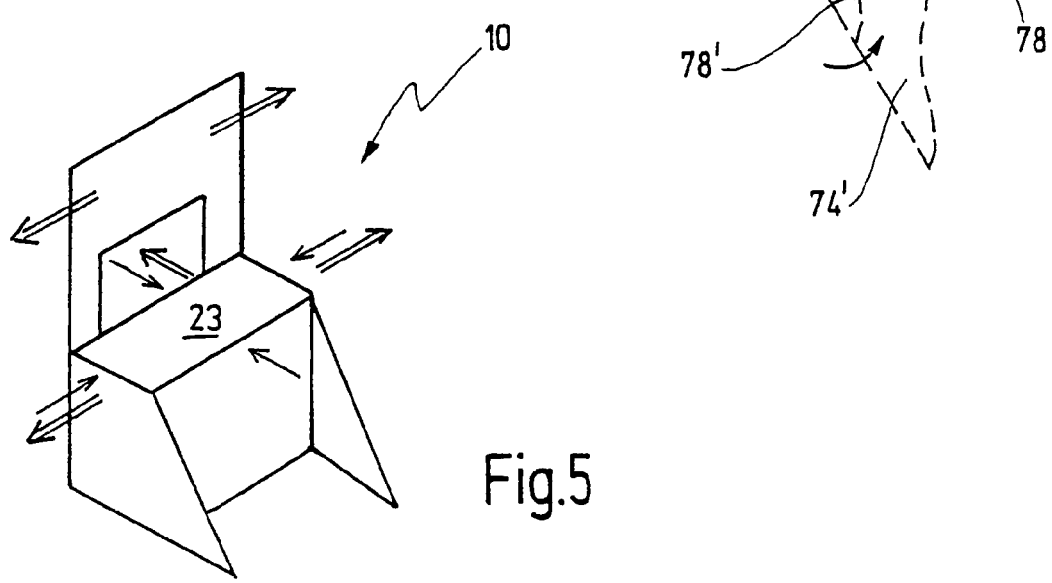

BASE FRAMEWORK FOR A MANIPULATING APPARATUS AND MANIPULATING APPARATUS

FOREIGN PRIORITY

This application claims the right of foreign priority to European Patent Application No. 03 004 123.0 filed with the European Patent Office on Feb. 26, 2003, having the same inventor, which is incorporated herein by reference in its entirety.

BACKGROUND OF THE INVENTION

1. Field of the Invention

The present invention relates to a base framework for a manipulating apparatus, in particular for an automation cell, which is designed for being combined with at least one machine tool.

The invention also relates to such a manipulating apparatus.

2. Discussion of the Background Prior Art

In the field of machine tools, there has been for some years a pronounced trend towards fully automatic production. In order to ensure operation of the machine tools free of interruption in this case, manipulating apparatuses in the form of "automation cells" are provided. The automation cells are often connected to the machine tools via portals and serve to feed workpieces to be machined to the machine tool or to discharge machined workpieces from the machine tool. For this purpose, the automation cells are provided with a supply module.

Workpieces are continuously provided via the supply module (for example via accumulating or intermittent-discharge conveyors). This approach is pursued in particular when working processes are interlinked. Furthermore, workpieces of the automation cells can also be supplied via pallet modules or drawer modules. In the case of pallet modules, in each case stacks of pallets in the form of work carriers are delivered via pallet transport carriages (often manually), or pallet stacks with machined workpieces are removed manually by means of a pallet transport carriage.

The automation cell therefore serves as a buffer for unmachined workpieces to be fed to the machine tool and also as a buffer for workpieces to be removed which have been machined by the machine tool.

As a rule, the automation cells are specially designed and produced for combination with a specific machine tool. The automation cell can be optimized for the respective working sequences by this measure. However, the design cost is quite considerable. Furthermore, conversion of the automation cell, as becomes necessary, for example, during a change to a new generation of machine tools, can only be realized with difficulty. As a rule, therefore, such conversions are only carried out at the automation cell manufacturer's site.

Examples of such automation cells have been disclosed by DE 42 12 178 A1 or by U.S. Pat. No. 5,353,490. Such a specially fabricated automation cell has also been disclosed by DE 101 02 413 C1.

Furthermore, there have been attempts (e.g. DE 41 17 438 A1) to configure the construction of the automation cell in a flexible manner. In this prior art, the framework of the automation cell is composed of extruded profiles (aluminium as a rule) which have T slots known per se. Consequently, any desired frameworks can be assembled by cutting the extruded profiles to length and connecting the same like crosspiece/post constructions. Furthermore, it is to be possible to extend a base unit for various applications in a modular manner.

The base unit disclosed in DE 41 17 439 A1 essentially has an underframe of extruded profiles, above which a transfer line is set up. A parallelepiped framework for an enclosure is provided above the underframe. A portal robot is mounted on a table top which separates the underframe from the enclosure framework. A control unit is attached laterally to the underframe from outside.

The long-term stability of such frameworks of extruded profile is unfortunately not always satisfactory. Furthermore, increased space is required in particular due to the attachment of functional elements to the framework on the outside.

Finally, EP 0 865 869 B1 discloses an automation cell for manipulating workpieces which has an approximately parallelepiped-shaped pedestal like a machine bed. The pedestal has a multiplicity of interfaces or fastening points which are arranged like a chessboard pattern on its surface and side faces. The pedestal module therefore enables framework elements and/or functional modules to be fastened at various locations in order to permit a modular type of construction of the automation cell. An automation cell based on the pedestal has vertical posts of the same height at the four corners of the pedestal, on the top side of which posts a portal module is fixed. The automation cell is cased from outside in a conventional manner per se. A control unit is located in the interior of the casing in a corner of the interior space. The control unit must therefore be provided with a separate housing in order to protect the electrical, pneumatic and/or hydraulic equipment contained therein from contaminants, oil, etc.

SUMMARY OF THE INVENTION

Against the above background, the problem underlying the invention is to specify a base framework for a manipulating apparatus which can be constructed in a modular manner, which base framework has high stability, permits the construction of automation cells having a small construction volume and ensures especially high flexibility during the construction or conversion of automation cells.

This object is achieved by a base framework for a manipulating apparatus which can be constructed in a modular manner, in particular for an automation cell which is designed for being combined with at least one machine tool, comprising
  a front wall, a rear wall and side walls which enclose a control space for a control device, a process platform being set up above the control space,
  the front wall having at least one mechanical interface for fixing a supply module which serves to supply workpieces, and
  the rear wall having a top rear-wall part which projects beyond the process platform and, on its front side pointing towards the process platform, has a first plurality of mechanical interfaces for the locally variable fixing of a process module for manipulating and/or processing supplied workpieces, the top rear-wall part also having an opening which is arranged above the process platform.

Furthermore, the above object is achieved by a manipulating apparatus having such a base framework.

The present invention is based on the idea of specifying a base framework which can be used universally for any desired applications. In this way, the production of the automation cells can be simplified on the one hand.

The base framework has a control space for a control device required in every automation cell. This control space is enclosed on all sides by the base framework itself, so that a separate housing for the control device is not necessary. Furthermore, the base framework can be designed to be especially torsionally rigid. The manipulation and processing of workpieces may be effected above the control space, that is to say above the process platform. The supply of workpieces may be effected from the front side. For this purpose, a mechanical interface for fixing a supply module is provided.

In alternative applications, however, the supply of workpieces may also be effected from the side on a plane parallel to the process platform. Furthermore, by the provision of an opening in the top rear-wall part, supply of workpieces may be effected from the rear side.

Due to the provision of a plurality of mechanical interfaces on the front side of the top rear-wall part, a process module can be attached at any desired location. For example, a portal for connecting to the machine tool can consequently be attached to the rear wall. In addition, a robot, in particular a buckling-arm robot, can be attached there. Consequently, the entire process platform can be used for the feeding and discharge of workpieces or for the arrangement of processing modules for processing workpieces.

It goes without saying, however, that a robot may also be arranged on the process platform if this is more appropriate for reasons specific to the application.

On the whole, therefore, a base framework for an automation cell is provided which can be of especially robust design, permits a minimum overall construction volume of the automation cell and provides especially high flexibility for the construction of the most varied types of manipulating apparatuses for the most varied applications.

The above object is therefore completely achieved.

According to an especially preferred embodiment, the top rear-wall part is designed as a frame, on the front side of which an interface panel is fixed which has the first plurality of mechanical interfaces.

Especially high stability is achieved by the design of the top rear-wall part as a frame construction. In this case, it goes without saying that the frame is preferably designed as a rigid frame, that is to say produced by welding post elements and crosspiece elements for example.

In addition, the base framework can be assembled in a simple manner due to the provision of a separate interface panel.

According to a further preferred embodiment, the top rear-wall part is designed as a frame, and at least one frame part is designed as a hollow profile for accommodating cable looms.

Hollow profiles can be constructed with high stability. By cable looms being accommodated in the hollow profile, the process modules, for example, can be connected to the control device via concealed lines. "Cable clutter" is consequently avoided, in particular in the region above the process platform.

In this case, it is especially preferred if two lateral frame posts of the top rear-wall part are designed as hollow profiles for accommodating cable looms.

In this embodiment, a connection between the region of the first plurality of mechanical interfaces and the control device can be realized in an especially simple manner from the design point of view.

Furthermore, it is advantageous in this case if the rear-wall opening is defined laterally by the frame posts.

Due to this measure, the rear-wall opening can be realized without additional design outlay.

According to a further preferred embodiment, at least one hollow profile of the top rear-wall part has a cable opening for passing through a cable loom in order to connect the control space (and thus a control device subsequently mounted therein) to a process module.

It is especially preferred in this case if cable openings are provided on those sides of the frame posts which point towards the rear-wall opening.

In this way, the control space can also be connected in a simple manner to process modules which are arranged in the region of the process platform.

On the whole, it is especially advantageous if a process plate is arranged on the process platform and has a second plurality of mechanical interfaces for the locally variable fixing of a process module for manipulating and/or processing supplied workpieces.

This measure results in especially high variability and flexibility when arranging process modules inside the automation cell. It goes without saying that the interfaces of the process plate should be designed so as to be of an identical type to the interfaces of the interface panel.

According to a further preferred embodiment, the process plate can be fitted through the opening in the rear wall.

This permits flexible adaptation of the automation cell to different processing and/or manipulating tasks in situ. Furthermore, this facilitates the preassembly and maintenance of such process modules, since the said process modules can be removed together with the process plate through the rear-wall opening.

It is likewise advantageous if a bracket projecting forwards is fitted on the front side, pointing towards the process platform, of the top rear-wall part, the underside of this bracket having at least one further mechanical interface for fixing a process module for manipulating and/or processing supplied workpieces.

In this way, it is possible to fix a process module, in particular a buckling-arm robot, to the bracket from below, thereby resulting in even higher flexibility overall when arranging the process modules.

By the optimized arrangement of the process modules which is made possible in this way, the manipulating and/or processing capacity of the automation cell can likewise be optimized.

Furthermore, it is advantageous if two feet extend forwards from the front wall.

Increased stability is thereby achieved, in particular relative to tilting moments, which occur due to the attachment of process modules to the front side of the top rear-wall part and/or to the projecting bracket.

It goes without saying in this case that it is especially advantageous for reasons of stability if the two feet are rigidly connected to the base framework, in particular to its rear wall, in order to be able to absorb the increased tilting moments.

It is especially advantageous in this case if enclosing walls are arranged above the feet and in extension of the side walls, these enclosing walls laterally enclosing a supply space for a supply module.

A supply space which is essentially enclosed on three sides and is protected from external effects is provided by this measure.

On the whole, it is also advantageous if a cable opening for passing through a cable loom is provided on the front wall of the base framework in order to connect a supply module to the control space.

In this way, a supply module which is arranged in the supply space in front of the front side can be connected to a control device without cable clutter.

In the case of the manipulating apparatus according to the invention, it is especially advantageous if the base framework supports a housing which encloses a supply space in front of the front wall and a process space above the process platform.

The housing therefore serves to enclose the manipulating and supply space inside the manipulating apparatus, in particular for operator safety.

It is especially advantageous in this case if the housing has a door frame which is arranged in front of the supply space and on which a door is mounted.

This ensures, even in the ready-assembled state of the manipulating apparatus, that facilitated access to the process space is possible, in particular for maintenance personnel.

Furthermore, it is preferred if the housing has at least one side cover for laterally covering the process space.

It goes without saying in this case that the side cover and/or the door can be provided with windows for observing the process space.

It goes without saying that the abovementioned features and the features still to be explained below can be used not only in the respectively specified combination but also in other combinations or on their own without departing from the scope of the present invention.

BRIEF DESCRIPTION OF THE DRAWINGS

Exemplary embodiments of the invention are shown in the drawing and are described in more detail below. In the drawing:

FIG. 3 shows a schematic exploded representation of a manipulating apparatus according to the invention based upon the base framework of FIGS. 1 and 2;

FIG. 5 shows a schematic representation of those possibilities of feeding and discharging workpieces which can be realized with the base framework according to the invention.

DESCRIPTION OF PREFERRED EMBODIMENTS

Figure 1:
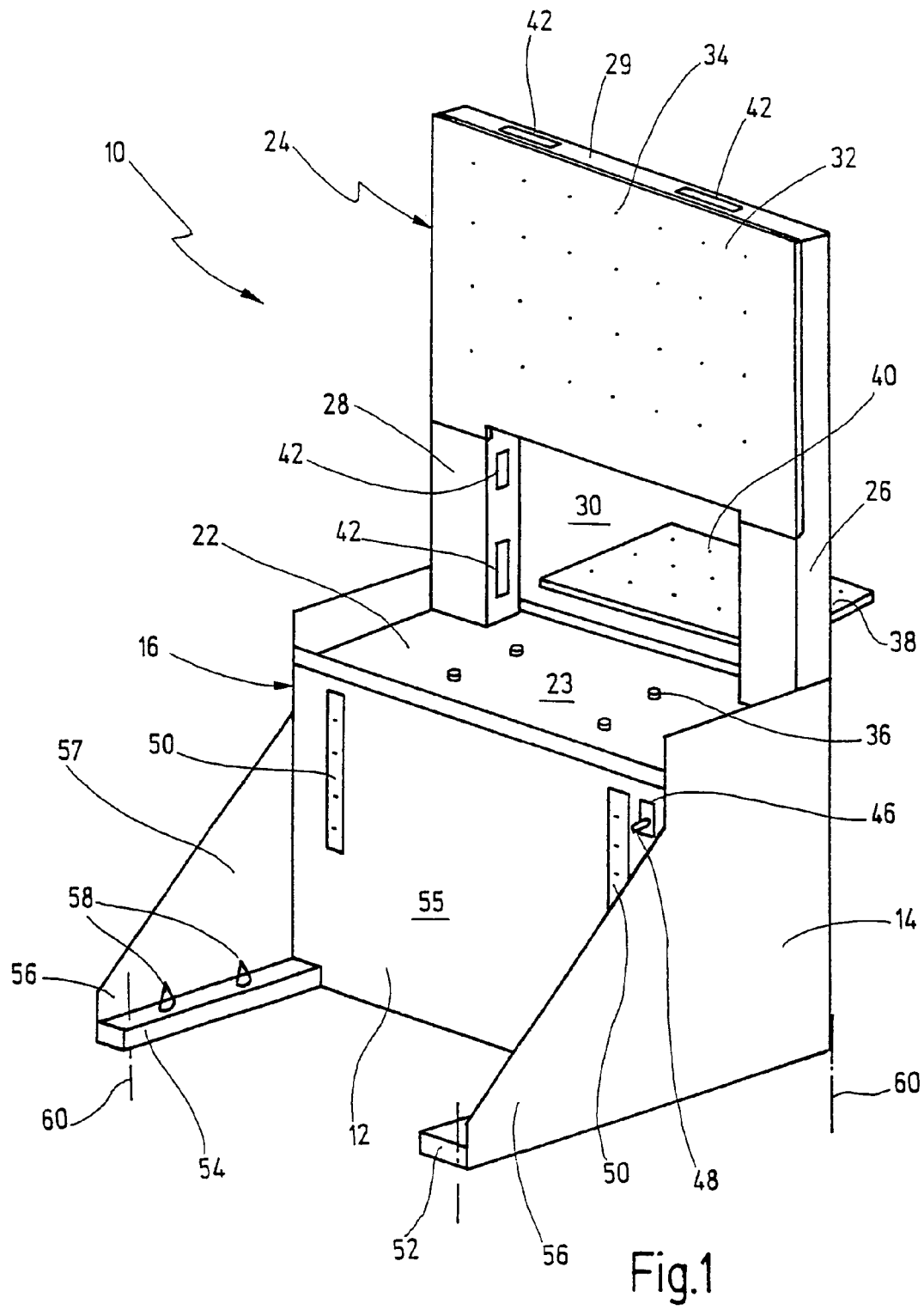
FIG. 1 shows a perspective schematic view of a base framework according to the present invention obliquely from the front.
Figure 2:
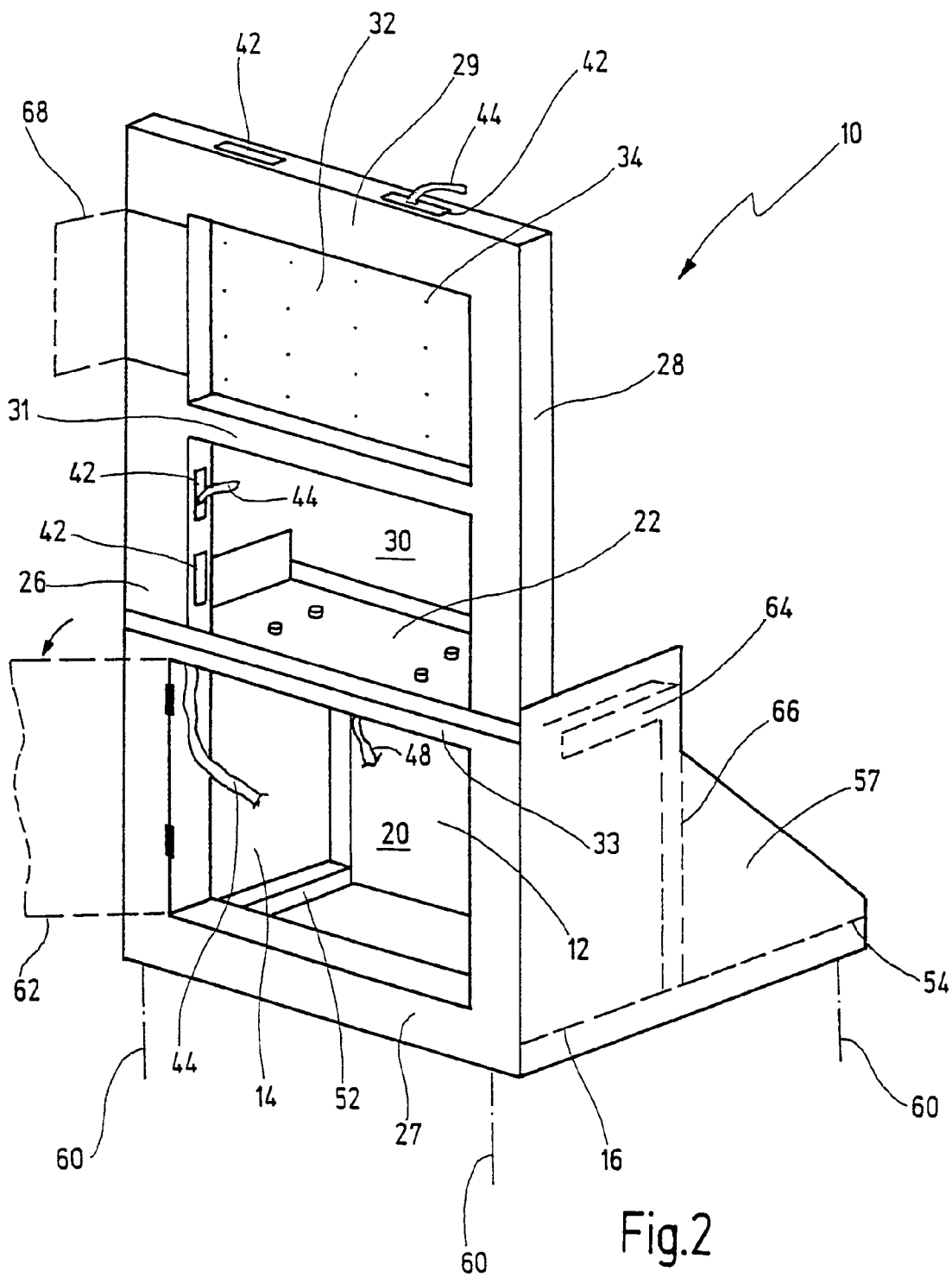
FIG. 2 shows a perspective schematic view of the base framework in FIG. 1 obliquely from the rear.

An exemplary embodiment of a base framework according to the invention is designated overall by 10 in FIGS. 1 and 2.

The base framework 10 has a front wall 12, two side walls 14, 16 and a rear wall 18 which enclose a control space 20 for accommodating a control device (not shown) for the manipulating apparatus.

Provided above the control space 20 is a process platform 22 which closes off the control space 20 from above. A process space 23 for the manipulation and/or processing of workpieces is set up above the process platform 22.

The rear wall 18 has a top rear-wall part 24 which extends beyond the process platform 22.

The rear wall 18 is designed as a robust frame construction with two vertical frame posts 26, 28.

The frame posts 26, 28 are connected to one another at their top end by a top crosspiece 29. A centre crosspiece 31 which connects the frame posts 26, 28 to one another is provided in the centre region between the top crosspiece 29 and the process platform 22.

A further bottom crosspiece 33 is provided at the level of the process platform 22. At their bottom end, the two frame posts 26, 28 are connected to one another by a floor crosspiece 27.

The frame posts 26, 28 and the crosspieces 27, 29, 31, 33 are designed as hollow profiles, are preferably made of steel and are rigidly connected to one another, for example by welding.

An interface panel 32 which provides a multiplicity of uniformly distributed fastening points or interfaces 34 is attached to the front side of the top rear-wall part 24.

The interface panel 32 extends from the top crosspiece 29 down to the centre crosspiece 31.

A rear-wall opening 30 is defined by the centre crosspiece 31, the bottom crosspiece 33 and the frame posts 26, 28.

Support means 36 for supporting a process plate 38 are provided on the process platform 22. The process plate 38 is dimensioned in such a way that it can be put horizontally through the rear-wall opening 30 onto the process platform 22. The support means, as in the case shown, may be formed by individual locating points. In the same way, however, it is also possible to provide longitudinal guides as support means, on which the process plate 38 can be pushed in.

The process plate 38 is provided with a multiplicity of regularly arranged fastening points or interfaces 40, which as a rule are of identical construction to the interfaces 34 of the interface panel 32.

A plurality of cable openings 42 are provided on the frame formed by the frame posts 26, 28 and the crosspieces 27, 29, 31 and 33.

The cable openings 42 enable a cable loom or a plurality of cable looms 44 to be passed through the frame elements in order to connect process modules, still to be explained below, to a control device in the interior of the control space 20.

In a similar manner, at least one cable opening 46 is provided in the front wall 12 in order to pass through a cable loom 48. The cable loom 48 serves to connect a control device in the control space 20 to a supply module which is to be arranged in front of the front side 12 and whose function will likewise be explained below.

In the same manner, a mechanical interface 50 for fixing the supply module is located on the front side 12.

Two feet 52, 54 extend laterally forwards from the rear wall 18, to be precise in such a way that they project beyond the front wall 12.

The feet 52, 54 serve in particular to increase the tilting stability of the base framework 10. Furthermore, enclosing plates 56 and 57, respectively, extend from the front wall 12 in extension of the side walls 14, 16. A supply space 55 for arranging a supply module is therefore defined by the enclosing plates 56, 57 and the front wall 12.

The enclosing plates 56, 57 may be formed in one piece with the side walls 14, 16 in order to further increase the stability of the base framework 10.

Furthermore, support points 58 for supporting a supply module may be provided on the top side of the projecting parts of the feet 52, 54.

Indicated schematically at 60 are anchoring points with which the base framework 10 can be anchored on the floor in a conventional manner in terms of construction.

Furthermore, it is shown in FIG. 2 that the opening of the control space 20, this opening being formed by the bottom crosspiece 33, the floor crosspiece 27 and the frame posts 26, 28, can be closed by a door 62 in order to close off the control space on all sides.

To increase the stability, two supporting frame parts 64 which extend forwards from the frame posts 26, 28 and support the process platform 22 from below may be provided. Furthermore, to further increase the stability, vertical supports 66 which support the free ends of the supporting frame parts 64 on the feet 52 and 54, respectively, may be provided.

Furthermore, it is indicated schematically at 68 that at least sections of the hollow profile parts of the frame of the rear wall 18 can be accessible via doors or the like in order to make it easier to thread through cable looms.

On the whole, it can be stated that the base framework 10 has high strength and stability, to be precise due to the robust construction of the frame of the rear wall 18 and of the feet 52, 54 and optionally of the supporting frame parts 64 and the vertical supports 66. These elements are firmly connected to one another (e.g. by welding) and form the "skeleton" of the base framework.

Due to the provision of the rear wall opening 30, the process space 23 is freely accessible from all four sides. As a result, high flexibility with regard to the supply and discharge of workpieces and with regard to the feeding of workpieces to a machine tool and the return from the machine tool are realized.

Finally, high flexibility with regard to the attachment of process modules for manipulating and/or processing workpieces is obtained due to the interface panel 32 on the rear wall 18 and due to the preferably provided process plate 38 having the respective interfaces 34, 40.

Since the process plate 38 can be inserted via the opening 30, process modules can be preassembled on the process plate 38. As a result, the assembly of the manipulating apparatus erected on the base framework 10 is simplified.

A typical example of application of a manipulating apparatus 70 according to the invention, as can be constructed with the base framework 10 according to the invention, is explained with reference to FIGS. 3 and 4.

Figure 4:
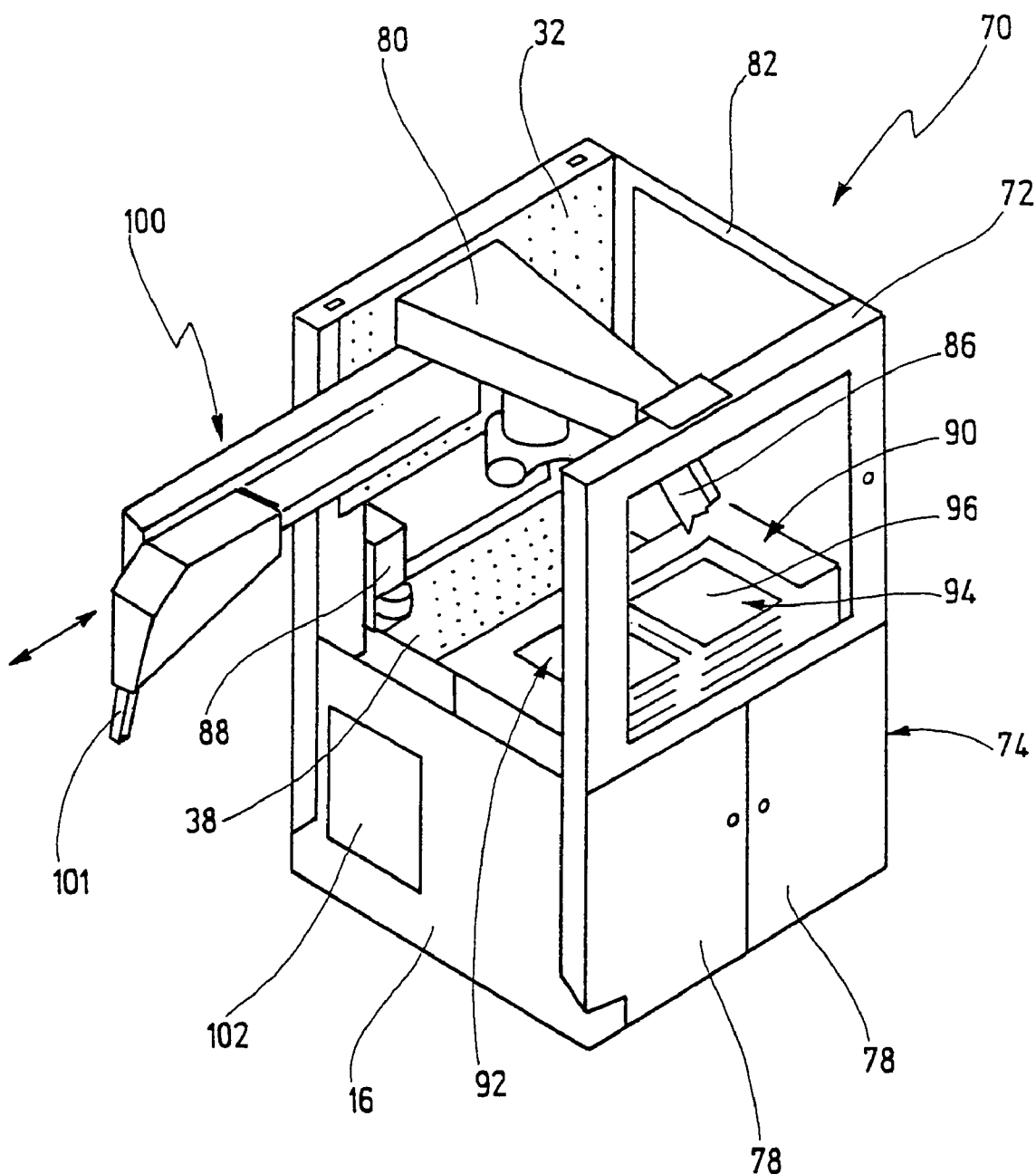
FIG. 4 shows the manipulating apparatus of FIG. 3 in the assembled state in combination with a portal for feeding workpieces into an associated machine tool.

The manipulating apparatus 70 in FIGS. 3 and 4 is based on the base framework 10 in FIGS. 1 and 2. A door frame 72 in an inverted U shape is mounted on the front end of the feet 52, 54. The top side of the door frame 72 lies approximately at the level of the top side of the rear wall 18.

A door 74 can be pivotably mounted on the door frame 72, as is shown schematically at 74' in FIG. 3.

The door 74 is horizontally divided in two parts. A top door part has an observation window 76. The bottom door part has two door leaves 78 which can be swung open forwards.

The door leaves 78 can be opened when door 74 is closed, as is shown schematically at 78'.

A bracket 80 projecting forwards is fastened to the interface panel 32, to be precise approximately in the centre at the top. The bracket 80 is supported at its free end on the top side of the door frame 72.

The right-hand side (as viewed from the front) of the manipulating apparatus 70 is closed with a side cover 82 which has a window 84 for observing the process space 23.

A buckling-arm robot, in particular a 6-arm robot 86, is mounted on the underside of the bracket 80.

The buckling-arm robot 86 forms a manipulating module for manipulating workpieces inside the manipulating apparatus 70.

Indicated schematically at 88 is a processing module which has been preassembled on the process plate 38.

The processing module 88 serves, for example, to carry out preliminary-treatment or rework processes on the workpieces before they are transferred into the associated machine tool or returned from the latter. The processing module 88 may be, for example, a deburring module.

As shown in FIG. 4, a supply module 90 is fixed in the supply space 55.

The supply module 90 serves to accommodate two pallet stacks 92, 94, which, for example, can be moved into or out of the supply module 90 via the door leaves 78 by means of a pallet manipulating carriage.

A first stack 92 of pallets or work carriers 96 and a second stack 94 of this kind are therefore located inside the supply space 55.

Typically, the one stack 92 contains workpieces to be machined, and machined workpieces are deposited on the second stack 94.

Furthermore, it is shown in FIG. 4 that a manipulating portal 100 is mounted on the interface panel 34, this manipulating portal 100 providing a connection to the associated machine tool.

There is no side cover 82 fitted on the side at which the manipulating portal 100 comes out of the manipulating apparatus 70. It goes without saying, however, that a smaller side cover 82 may also be mounted as an alternative.

Shown at 102 in FIG. 4 is a maintenance opening in order to ensure direct access to control modules in the control space 20.

The mode of operation of the manipulating apparatus 70 is generally known in the prior art. This is therefore only briefly described below.

Workpieces to be machined are moved into the supply module 90 on stacked work pallets 96 via the door leaves 78. The buckling-arm robot 86 in each case removes a workpiece from the pallet stack 92 and transfers the said workpiece either to the processing module 88 for preliminary treatment or directly to a work changer 101 of the manipulating portal 100. The workpiece is then transferred by means of the manipulating portal 100 to the associated machine tool (not shown). There, it is clamped in place by the work changer 101 for the machining. After this, or at the same time as this, a workpiece already machined is transported by the work changer 101 back to the manipulating apparatus 70. It is received there by the buckling-arm robot 86. After that, it is either deposited directly onto the second pallet stack 94 or first subjected to rework in a processing module 88.

It goes without saying that, in addition to the processing module 88 shown, further processing modules can be fixed on the process plate 38 and/or on the interface panel 32.

The manipulating apparatus 70 shown, as stated, is only one example of a large number of different manipulating apparatuses which can be constructed on the basis of the base framework 10.

Thus it goes without saying that the manipulating portal 100 can come out of the manipulating apparatus 70 on the other side in the same manner. Furthermore, the manipulating portal 100, for interlinking machine tools, can also pass through the manipulating apparatus 70 and interlink two opposite machine tools.

Furthermore, it goes without saying that the manipulating apparatus 70 can also be entirely constructed without manipulating portal 100, namely if the manipulating apparatus 70 is set up in direct proximity to a machine tool. In this case, for example, a manipulating module, such as a buckling-arm robot, can be mounted at the lateral outer margin of the interface panel 32 in order to transfer workpieces directly to the machine tool or clamp them in position there.

In the same manner, it goes without saying that the supply of workpieces may be effected via drawer modules which are arranged in the supply space 55 instead of the pallet supply module 90 shown. Such drawer modules are known per se in the prior art.

It also goes without saying that accumulating or intermittent-discharge conveyors may be provided for supplying workpieces, these conveyors being directed past the manipulating apparatus 70 laterally in parallel or behind the rear wall 18 in such a way that an appropriately positioned buckling-arm robot can easily remove the workpieces from them.

On account of the flexible modular construction, based on the base framework 10 according to the invention, it is possible to reset a manipulating apparatus 70 in situ in a simple manner in order to set up the manipulating apparatus for a new application. For example, a situation may arise in which a machine tool is exchanged for one of a newer generation. It may then be necessary to shift or exchange the manipulating modules and processing modules in the manipulating apparatus 70. On account of the flexible interface panel 32 and the flexible process plate 38, this presents no problem.

Consequently, for such resetting work, it is not necessary to transport the manipulating apparatus to the manufacturer.

FIG. 5 schematically shows the various possibilities for the supply of workpieces (single arrow) and the feeding of workpieces to an associated machine tool (double arrow).

The invention claimed is:

1. A base framework for a manipulating apparatus which can be constructed in a modular manner, in particular for an automation cell which is designed for being combined with at least one machine tool, comprising
    a front wall, a rear wall and side walls which enclose a control space for a control device, a process platform being set up above the control space,
    the front wall having at least one mechanical interface for fixing a supply module which serves to supply workpieces, wherein the at least one mechanical interface of the front wall is located on the front side of the front wall, and
    the rear wall having a top rear-wall part which projects beyond the process platform and, on its front side pointing towards the process platform, has a first plurality of mechanical interfaces forte locally variable fixing of a process module for manipulating and/or processing supplied workpieces, the top rear-wall part also having an opening which is arranged above the process platform, and the top rear-wall part being designed as a frame, on the front side of which an interface panel is fixed which has the first plurality of mechanical interfaces.

2. The base framework according to claim 1, the top rear-wall part being designed as a frame, and at least one frame part being designed as a hollow profile for accommodating cable looms.

3. The base framework according to claim 2, two lateral frame posts of the top rear-wall part being designed as hollow profiles for accommodating cable looms.

4. The base framework according to claim 3, the rear-wall opening being defined laterally by the frame posts.

5. The base framework according to claim 4, at least one hollow profile at the top rear-wall part having a cable opening for passing through a cable loom in order to connect the control space to a process module, and cable openings being provided on those sides of the frame posts which point towards the rear-wall opening.

6. The base framework according to claim 2, at least one hollow profile of the top rear-wall part having a cable opening for passing through a cable loom in order to connect the control space to a process module.

7. The base framework according to claim 1, a process plate being arranged on the process platform and having a second plurality of mechanical interfaces for the locally variable fixing of a process module for manipulating and/or processing supplied workpieces.

8. The base framework according to claim 7, it being possible for the process plate to be fitted through the opening in the rear wall.

9. The base framework according to claim 1, bracket projecting forwards being fitted on the front side, pointing towards the process platform, of the top rear-wall part, the underside of this bracket having at least one further mechanical interface for fixing a process module for manipulating and/or processing supplied workpieces.

10. The base framework according to claim 1, two feet extending forwards from the front wall.

11. The base framework according to claim 10, enclosing walls being arranged above the feet and in extension of the side walls, these enclosing walls laterally enclosing a supply space for a supply module.

12. The base framework according to claim 1, a cable opening for passing through a cable loom being provided on the front wall in order to connect a supply module to the control space.

13. A manipulating apparatus, in particular an automation cell, which is designed for being combined with at least one machine tool, comprising a base framework which comprises:
    a front wall, a rear wall and side walls which enclose a control space for a control device, a process platform being set up above the control space,
    the front wall having at least one mechanical interface for fixing a supply module which serves to supply workpieces, wherein the at least one mechanical interface of the front wall is located on the front side of the front wall, and
    the rear wall having a top rear-wall part which projects beyond the process platform and, on its front side pointing towards the process platform, has a first plurality of mechanical interfaces for the locally variable fixing of a process module for manipulating and/or processing supplied workpieces, the top rear-wall part also having an opening which is arranged above the process platform, and the top rear-wall part being designed as a frame, on the front side of which an interface panel is fixed which has the first plurality of mechanical interfaces.

14. The manipulating apparatus according to claim 13, the base framework supporting a housing which encloses a supply space in front of the front wall and a process space above the process platform.

15. The manipulating apparatus according to claim 14, the housing having a door frame which is arranged in front of the supply space and on which a door is mounted.

16. The manipulating apparatus according to claim 14, the housing having at least one side cover for laterally covering the process space.

17. The manipulating apparatus according to claim 13, the top rear-wall part of the base framework being designed as a frame, and at least one frame part being designed as a hollow profile for accommodating cable looms.

18. The manipulating apparatus according to claim 17, two lateral frame posts of the top rear-wall part being designed as hollow profiles for accommodating cable looms.

19. The manipulating apparatus according to claim 18, the rear wall-opening being defined laterally by the frame posts.

20. The manipulating apparatus according to claim 19, at least one hollow profile at the top rear-wall part having a cable opening for passing through a cable loom in order to connect the control space to a process module, and wherein cable openings being provided on those sides of the frame posts which point towards the rear-wall opening.

21. The manipulating apparatus according to claim 17, at least one hollow profile of the top rear-wall part having a cable opening for passing through a cable loom in order to connect the control space to a process module.

22. The manipulating apparatus according to claim 13, a process plate being arranged on the process platform and having a second plurality of mechanical interfaces for the locally variable fixing of a process module for manipulating and/or processing supplied workpieces.

23. The manipulating apparatus according to claim 22, it being possible for the process plate to be fitted through the opening in the rear wall.

24. The manipulating apparatus according to claim 13, a bracket projecting forwards being fitted on the front side, pointing towards the process platform, of the top rear-wall part, the underside of this bracket having at least one further mechanical interface for fixing a process module for manipulating and/or processing supplied workpieces.

25. The manipulating apparatus according to claim 13, two feet extending forwards from the front wall.

26. The manipulating apparatus according to claim 25, enclosing walls being arranged above the feet and in extension of the side walls, these enclosing walls laterally enclosing a supply space for a supply module.

27. The manipulating apparatus according to claim 13, a cable opening for passing through a cable loom being provided on the front wall in order to connect a supply module to the control space.

* * * * *